United States Patent [19]

Presby

[11] Patent Number: 5,371,818
[45] Date of Patent: Dec. 6, 1994

[54] INTEGRATED OPTICAL CIRCUIT AND METHODS FOR CONNECTING SUCH CIRCUITS TO GLASS FIBERS

[75] Inventor: Herman M. Presby, Highland Park, N.J.

[73] Assignee: AT&T Corp., Murray Hill, N.J.

[21] Appl. No.: 105,788

[22] Filed: Aug. 12, 1993

[51] Int. Cl.⁵ .............................................. G02B 6/30
[52] U.S. Cl. ...................................... 385/49; 385/14; 385/46
[58] Field of Search ................... 385/46, 47, 49, 14, 385/27, 20, 9, 15, 31, 39, 50

[56] References Cited

U.S. PATENT DOCUMENTS

| | | | |
|---|---|---|---|
| 5,015,059 | 5/1991 | Booth et al. | 385/49 |
| 5,076,654 | 12/1991 | Presby | 385/129 |
| 5,080,458 | 1/1992 | Hockaday | 385/49 X |
| 5,175,781 | 12/1992 | Hockaday et al. | 385/49 |
| 5,208,885 | 5/1993 | Dragone et al. | 385/49 |

OTHER PUBLICATIONS

Fiber Attachment for Guided Wave Devices by E. J. Murphy Journal of Lightwave Technology, vol. 6, No. 6. Jun. 1988, pp. 862–869.

*Primary Examiner*—John D. Lee
*Assistant Examiner*—Phan Thi Heartney

[57] ABSTRACT

A method of preparing a waveguiding structure, of the type comprising an optical waveguide supported by a semiconductor substrate, for splicing to an optical fiber, is described. In accordance with the disclosure, a layer of glass is deposited over a distance from the end of said waveguide, and the underlying semiconductor substrate is removed over a portion of said distance. The resulting modified waveguide can then be fused to optical glass fibers using standard fusion machines.

8 Claims, 3 Drawing Sheets

INTEGRATED OPTICAL CIRCUIT AND METHODS FOR CONNECTING SUCH CIRCUITS TO GLASS FIBERS

TECHNICAL FIELD

This invention relates to integrated optical circuits and, in particular, to silicon optical bench waveguide structures, and methods for coupling such structures to glass optical fibers.

BACKGROUND OF THE INVENTION

It has been recognized that if integrated optical circuits are to be incorporated into fiber communication systems, a practical method of coupling such circuits to glass fibers must be devised.

The typical integrated optical device is fabricated by the deposition of doped silica films on a silicon substrate. The films are then patterned to produce waveguides. See, for example, J. T. Boyd et at., *Optical Engineering* Vol. 24, No. 2, pp. 230–234, (1958), and F. S. Hickernell, *Solid State Technology*, Vol. 31, No. 11, pp. 83–88, 1988. The use of such techniques permits the fabrication of a variety of integrated optical devices such as multiplexers, adiabatic polarization splitters, and array star couplers.

In order to couple into and out of such devices, optical fibers are butt-coupled to the waveguide ends, and secured thereto by means of a bonding material such as an epoxy. In order to stabilize the attached array of fibers, and to provide sufficient confinement of the evanescent field of the guided wave, the device may be covered with a thin silica coverplate, affixed with a low loss adhesive, as described in U.S. Pat. No. 5,076,654, issued Dec. 31, 1991, and assigned to applicant's assigne.

Methods for aligning and permanently attaching fibers to waveguide devices on lithium niobate are described in a paper entitled "*Fiber Attachment for Guided Wave Devices*" by E. J. Murphy, published in the *Journal of Lightwave Technology*, Vol. 6, No. 6, June 1988. As indicated in this paper, permanent attachment, after alignment, is typically made using some type of adhesive.

The problem with the above-described arrangements is that the use of an epoxy, or other type or adhesive in the optical wavepath, is unacceptable for certain applications, such as submarine cables. Heat, applied during the curing period, or as a result of high intensity light signals, tends to deteriorate the adhesive and, hence, the bond. Accordingly, the use of such adhesives is to be avoided.

An alternative bonding technique, using glass as the adhesive, as described in U.S. Pat. No. 5,208,885, issued May 4, 1993 and assigned to applicant's assigne, produces very satisfactory heat insensitive connections. However, it has a number of commercial drawbacks. For example, the implementation of this technique requires a number of additional processing steps such as: the formation of a low melting temperature glass film on the end of each waveguide (or fiber); and the polishing of such films to make them flat. In addition, the film, being of a different material than the fiber and waveguide, may introduce stresses and strains in the optical wavepath at the waveguide-fiber junction.

It is, accordingly, the object of the present invention to avoid the use of bonding materials by providing a new waveguiding structure, and a method of fusing such a structure directly to an optical fiber using currently available technology.

SUMMARY OF THE INVENTION

The present invention utilizes existing electric arc fusion splicers and laser splicers for connecting silica waveguides to optical fibers in a manner similar to their use as fiber-to-fiber splicers. In accordance with the present invention, the waveguide structure is covered with a layer of glass to provide physical support to the end of the waveguide. The silicon substrate under the waveguide is then removed, leaving a platform of glass which can then be fused to a fiber in the are of a standard fusion machine.

It is an advantage of the invention that a plurality of connections can be made to the waveguide device using a standard electric-arc fusion splicing machine.

In an alternative embodiment of the invention, heat for splicing the fiber to the waveguide is obtained from a high power laser, such as a $CO_2$ laser.

DETAILED DESCRIPTION

Figure 1:
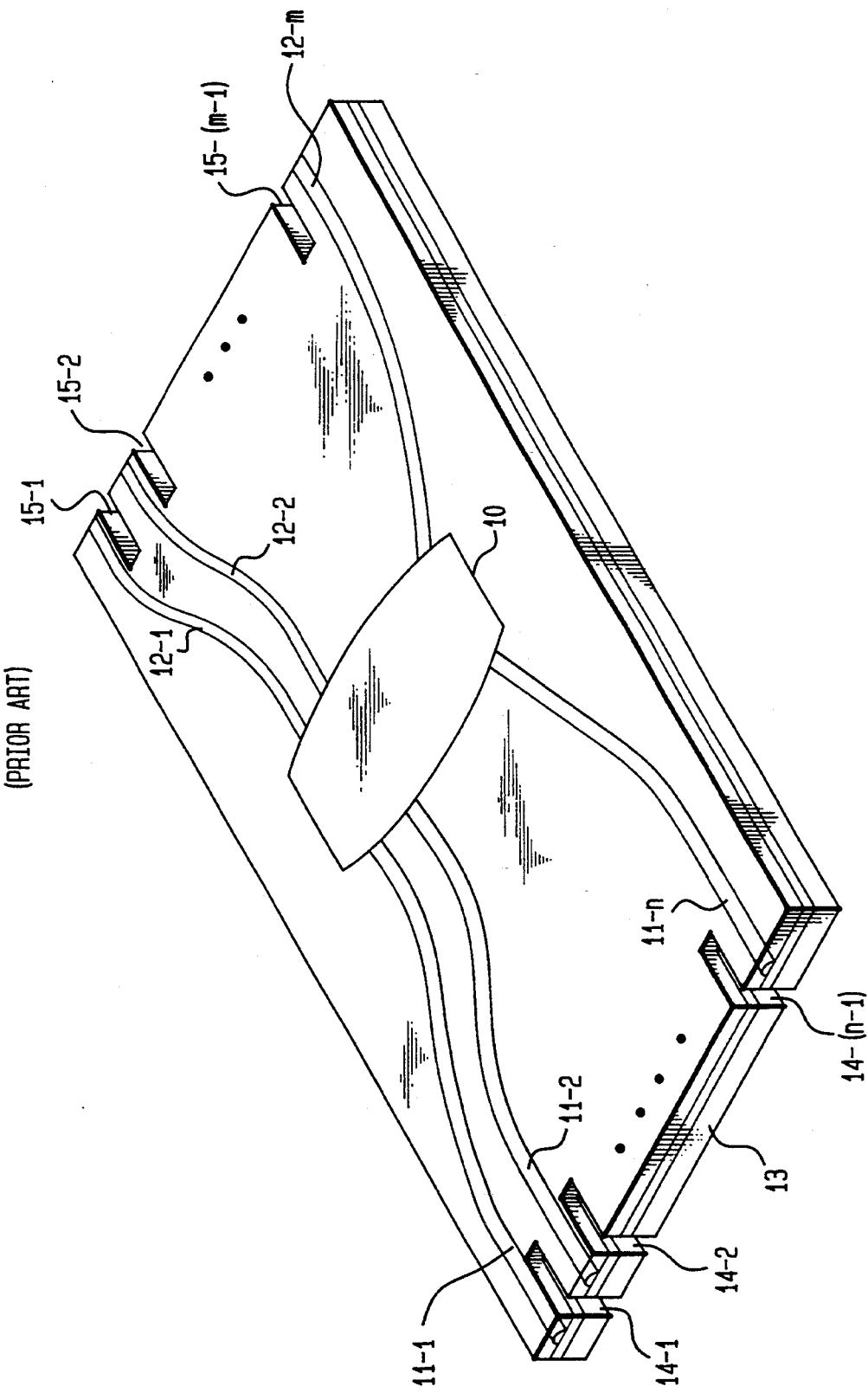
FIG. 1 shows the general configuration of the class of prior art integrated optical devices to which the invention relates.

Referring to the drawings, FIG. 1 shows the general configuration of the class of integrated optical devices to which the invention relates. Typically, such devices are fabricated by depositing doped silica waveguides on a silicon substrate using standard silica/silicon ($SiO_2$/Si) technology as described in *IEEE Photonics Technology Letters*, Vol. 1, No. 8, August 1984, pages 241–243, by C. Dragone et al. Such devices can be configured to form a variety of useful devices for communications and signal processing. Thus, in the illustrative embodiment shown, the interaction region 10 is illustrated without detail.

Signals are coupled into and out of region 10 by means of one or more single-mode waveguides 11-1, 11-2 . . . 11-n, and 12-1, 12-2 . . . 12-m. In a preferred embodiment, a section of silicon substrate 13 between the ends of the waveguides and the overlaying silica layers are advantageously removed to provide heat breaks 14-1, 14-2, . . . 14(n-1), and 15-1, 15-2 . . . 15-(m-1). The purpose of the heat breaks is to thermally insulate the ends of each waveguide from its adjacent waveguides, as explained in U.S. Pat. No. 5,208,885, issued May 4, 1993 and assigned to applicant's assigne.

Figure 2:
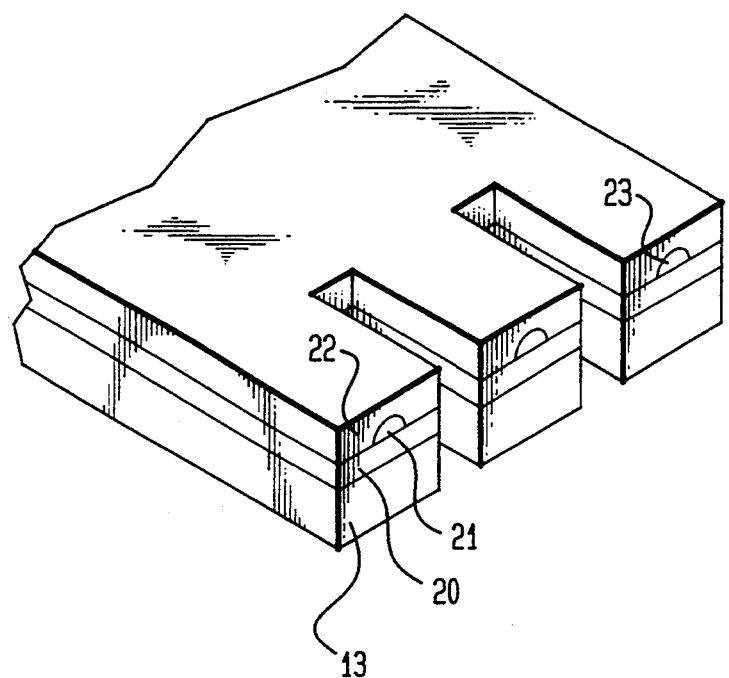
FIG. 2 shows, in greater detail, the fingers formed at the ends of the prior art waveguides, to which the invention relates, by the removal of portions of the structure between adjacent waveguides.

FIG. 2 shows, in greater detail, the fingers formed at the ends of the waveguides by the removal of portions of the structure between adjacent waveguides. Each finger includes a silicon substrate 13, a doped silica base layer 20, a core 21 and a cladding 22.

Figure 3:
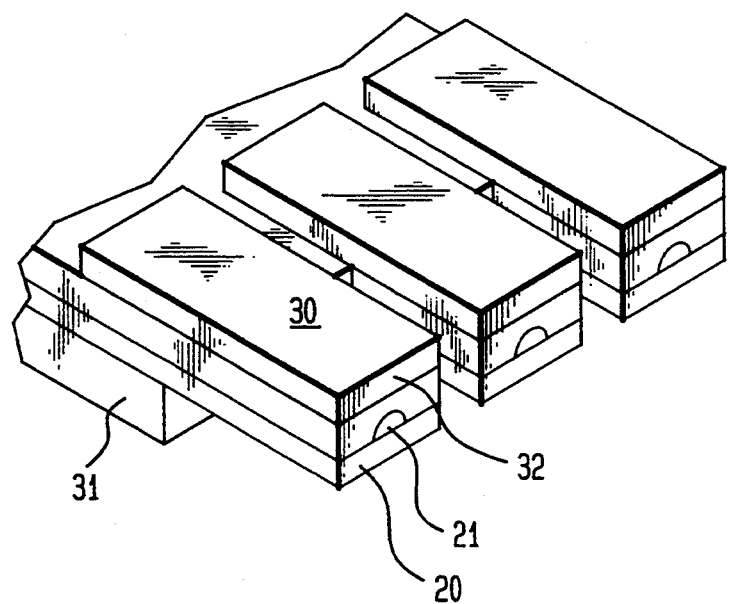
FIG. 3 shows the ends waveguides modified in accordance with the present invention.

In accordance with the present invention, a layer of glass is deposited over each of the fingers and a portion of the adjacent structure, and the silicon substrate under the fingers and under a portion of the adjacent structure is removed. These modifications to the ends of the waveguides are illustrated in FIG. 3 which shows a finger 30 under which the substrate 31 has been removed, and over which a layer of glass 32 has been deposited.

The primary function of the glass layer is to provide structural strength to the fingers after the silicon substrate has been removed. Thus, the glass advantageously extends over the entire finger and over a portion of the adjacent structure, as illustrated in FIG. 3. Typically, if the finger is 1 mm long, approximately 1 to 2 mm of the substrate is removed, and the glass layer extends between 2 to 4 mm to provide a secure anchor to the rest of the structure.

The glass is applied by melting it onto the waveguide. Accordingly, the glass should have a melting point that is lower than that of the silica waveguiding structure. In addition the coefficient of thermal expansion of the glass should match, as closely as possible, that of the optical circuits. Borosilicate glass, with a melting point of 821° C., and a coefficient of thermal expansion of 32.5, meets these requirements.

Because the silicon substrate interferes with the arc formation, and with the melting and subsequent fusing of the silicate glass, it is necessary that it be removed. This is done by sawing away the bulk of the substrate, and then etching away any residue. An EDP (Ethelene Diamine Pyrocatachol) etchant has been used for this purpose with satisfactory results.

Figure 4:
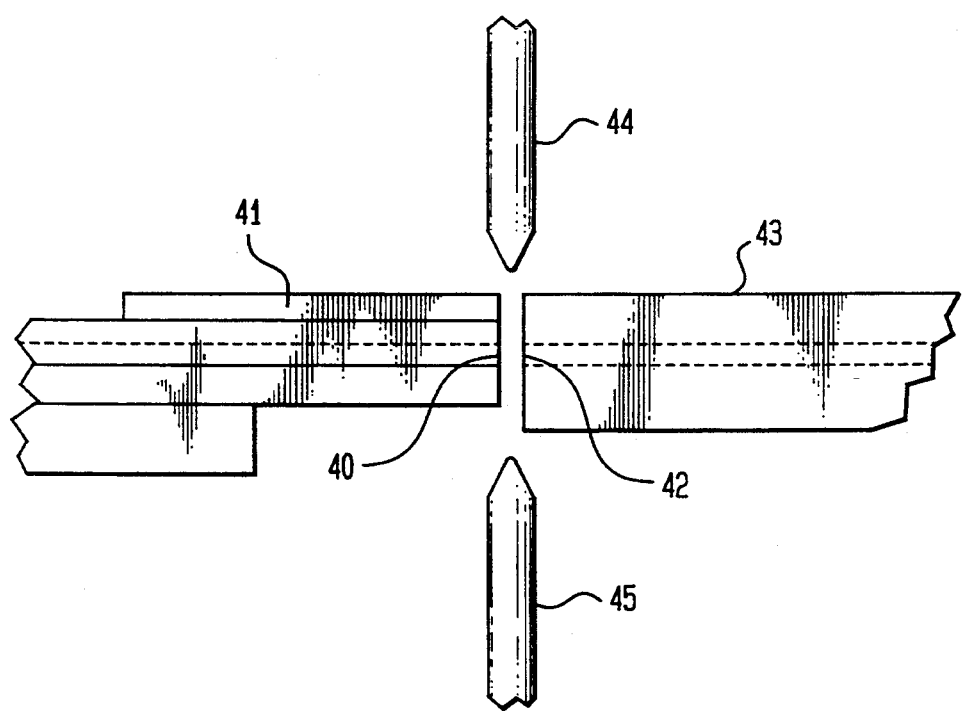
FIG. 4 shows a waveguide, whose end has been modified in accordance with the present invention, being spliced to an optical fiber in an electric-arc fusion machine.

With the fingers thus modified, they can be readily butt-coupled to the optical fibers using a standard electric-arc fusion splicing machine, as illustrated in FIG. 4. With the core 40 of the waveguide 41 aligned with the core 42 of fiber 43, and in contact with each other, the two are fused together in the arc of the fusion machine, represented by electrodes 44 and 45. Alternatively, the heat for splicing the fiber to the waveguides can be derived from a $CO_2$ laser.

Where a plurality of connections are to be made, an array of fibers can be simultaneously aligned with the waveguides of the optical devices using standard V-groove holders. In all cases the holding mechanism of the electric-arc fusion splicing machine is modified to accommodate the integrated optical circuits.

What is claimed is:

1. A method of connecting an optical waveguide supported by an underlying substrate to an optical fiber, comprising the steps of:
    depositing a layer of glass along the top of a portion of said waveguide extending a first distance from an end of said waveguide to a point along said waveguide;
    removing the underlying substrate of said waveguide from said end for a second distance therealong equal to or less than said first distance;
    aligning in butt relationship the core region of said waveguide end and the core region of said fiber;
    and heating said aligned waveguide and fiber to cause them to fuse together.
2. The method according to claim 1 wherein said heating is produced by a laser.
3. The method according to claim 1 wherein said heating is produced by an electric arc fusion machine.
4. The product made in accordance with the method of claim 1.
5. An integrated optical device including:
    an interaction region and at least one input optical waveguide and at least one output optical waveguide, each being formed on a semiconductor substrate;
    each of said waveguides having a first end and a second end, with the first of said ends being coupled to said interaction region; characterized in that:
    said substrate terminates along each of said waveguides at a point prior to said second end:
    and each of said waveguides is covered with a layer of glass extending from said second end to at least said prior point.
6. The method of preparing for splicing an optical waveguiding structure of the type comprising a waveguide resting on an underlying semiconductor substrate, including the steps of:
    depositing a layer of glass along the top of said waveguide over a first distance from the end of said waveguide;
    and removing the underlying substrate of said waveguiding structure over a second distance therealong from said end, where said second distance is equal to or less than said first distance.
7. The product made in accordance with the method of claim 6.
8. The method in accordance with claim 6 wherein said glass is borosilicate glass, said waveguide is made of doped silicate, and said substrate is silicon.

* * * * *